US011879985B2

(12) United States Patent
Thompson

(10) Patent No.: US 11,879,985 B2
(45) Date of Patent: Jan. 23, 2024

(54) METHOD AND SYSTEM FOR CALCULATING CENTER GPS COORDINATES USING SPHERICAL COORDINATES

(71) Applicant: Dane R Thompson, Scandia, KS (US)

(72) Inventor: Dane R Thompson, Scandia, KS (US)

( * ) Notice: Subject to any disclaimer, the term of this patent is extended or adjusted under 35 U.S.C. 154(b) by 0 days.

(21) Appl. No.: 18/314,066

(22) Filed: May 8, 2023

(65) Prior Publication Data

US 2023/0358899 A1 Nov. 9, 2023

Related U.S. Application Data

(60) Provisional application No. 63/339,417, filed on May 6, 2022.

(51) Int. Cl.
*G01S 19/50* (2010.01)
*A01G 25/09* (2006.01)

(52) U.S. Cl.
CPC ............ *G01S 19/50* (2013.01); *A01G 25/092* (2013.01)

(58) Field of Classification Search
CPC .............................. G01S 19/50; A01G 25/092
See application file for complete search history.

(56) References Cited

U.S. PATENT DOCUMENTS

| 6,928,339 | B2 | 8/2005 | Barker | |
|---|---|---|---|---|
| 7,156,328 | B2 | 1/2007 | Samaha | |
| 8,185,303 | B1 | 5/2012 | Weiting | |
| 10,893,650 | B1 * | 1/2021 | Sims | A01C 23/007 |
| 2006/0131450 | A1 * | 6/2006 | Samaha | A01G 25/092 239/722 |
| 2013/0184877 | A1 * | 7/2013 | Malsam | A01G 25/09 700/282 |

OTHER PUBLICATIONS

James Stewart, Calculus 3rd Edition, 1995, by Brooks/Cole Publisher (Year: 1995).*
Wikipedia, Global Positioning System, May 2022 (Year: 2022).*
Wikipedia, Geographic Coordinate System (Year: 2022).*
Stewart, pp. 750-751 (Year: 1995).*
AgSense User Guide 2012, AgSense LLC, Huron, S.D., 2012.

* cited by examiner

*Primary Examiner* — Alan D Hutchinson
(74) *Attorney, Agent, or Firm* — Jeffrey L. Thompson; Thompson Law, P.A.

(57) ABSTRACT

A method and system for determining center coordinates of a circular arc uses a position sensor, such as a GPS receiver, for receiving position coordinates for a plurality of points along the circular arc. The position coordinates for the plurality of points are then processed using an algorithm developed based on the geometric relationship for a cone inscribed in a sphere, with the sphere representing the Earth, the position coordinates defining points along a base perimeter of the cone, and an apex of the cone being located at the center of the Earth. A regression model is used to determine the center coordinates of the circular arc in a three-dimensional coordinate system without converting the position coordinates into two-dimensional coordinates. The method and system can be used to determine center coordinates for a center pivot sprinkler monitoring system or a vehicle guidance system.

18 Claims, 8 Drawing Sheets

METHOD AND SYSTEM FOR CALCULATING CENTER GPS COORDINATES USING SPHERICAL COORDINATES

RELATED APPLICATIONS

This application claims the benefit of U.S. Provisional Patent Application No. 63/339,417 filed on May 6, 2022, the contents of which are incorporated herein by reference.

BACKGROUND OF THE INVENTION

Field of the Invention

The present invention relates generally to methods and systems for determining center points of circular arcs, and in particular to methods and systems that use position coordinates collected by a GPS receiver traversing a circular arc to determine center coordinates of the circular arc.

Description of the Related Art

Remote monitoring systems for center pivot irrigation systems are known. For example, the FieldNET product available from Lindsay Corporation is a GPS-based monitoring system for center pivot irrigation sprinklers. The monitoring system allows farmers to view and monitor the position of the sprinkler in the field remotely. To represent the position of the sprinkler, a line is drawn from the center point of the sprinkler to the current location of the sprinkler's end tower. The FieldNET product, like most remote sprinkler monitoring solutions, requires the farmer to manually select or input coordinates for the center point of the sprinkler.

A GPS-based control system for center pivot irrigation systems is disclosed in U.S. Pat. No. 6,928,339 issued to Luke Barker and assigned to Reinke Manufacturing Company, Inc. Reinke's '339 patent describes a control system that monitors an angular position of a center pivot irrigation system in a field. The control system has an initial setup that requires programming a microprocessor with the coordinates of the center pivot point. This is achieved by inputting the center coordinates with a keyboard, or by temporarily mounting a GPS receiver at the pivot center to detect and store the center coordinates.

Vehicle guidance systems for agricultural tractors are also known. One such system is disclosed in U.S. Pat. No. 7,156,328 issued to Alain Samaha and assigned to Trimble Inc. The guidance system in Trimble's '328 patent includes a center pivot operating mode that creates circular guidance lines that are concentric with a determined center point of a center pivot irrigation system. The center point is determined by driving the vehicle with the guidance system through a given arc of the field in question (e.g., by following a sprinkler tire track), and then using a least squares algorithm to estimate the coordinates of the center point.

There is a need for a method and system to determine center point coordinates of a circular arc in a more efficient and accurate manner.

SUMMARY OF THE INVENTION

An object of the present invention is to provide an efficient and accurate method to determine center coordinates of a circular arc based on coordinates collected by a GPS receiver traversing the circular arc.

A further object of the present invention is to provide a method and system for determining center point coordinates of a circular arc using spherical coordinates derived from a GPS receiver traversing the circular arc.

A further object of the present invention is to provide a method and system for determining center point coordinates for a center pivot irrigation system based on GPS coordinates for points on a circular arc traversed by a field monitor located on the irrigation system to simplify the initial setup and use of the field monitor.

A further object of the present invention is to provide a method and system for determining center point coordinates for use in a vehicle guidance system.

To accomplish these and other objects, the present invention provides a method and system for determining center coordinates of a circular arc, such as a path of movement of a center pivot irrigation system. A position sensor, such as a GPS receiver, is provided for receiving position coordinates for a plurality of points along the circular arc. The position coordinates for the plurality of points are processed using an algorithm developed based on the geometric relationship for a cone inscribed in a sphere, with the sphere representing the Earth, the position coordinates defining points along a base perimeter of the cone, and an apex of the cone being located at the center of the Earth. A regression model is used to determine the center coordinates of the circular arc in a three-dimensional coordinate system without converting the position coordinates into two-dimensional coordinates, thereby improving the efficiency and accuracy of the center point determination. The method and system can be used to determine center coordinates for a center pivot sprinkler monitoring system or a vehicle guidance system.

According to one aspect of the present invention, a method of determining center coordinates of a center pivot irrigation system is provided, comprising: receiving GPS coordinates for a plurality of points along a circular arc traversed by the center pivot irrigation system; and processing the GPS coordinates for the plurality of points to determine the center coordinates of a center pivot point of the center pivot irrigation system using spherical coordinates.

According to another aspect of the present invention, an irrigation monitoring system for monitoring a rotational position of a center pivot irrigation system in a field is provided, comprising: a GPS receiver for receiving GPS coordinates at a plurality of points along a circular arc traversed by the center pivot irrigation system; and a means for processing the GPS coordinates to determine center coordinates of a center pivot point of the center pivot irrigation system and the rotational position of the center pivot irrigation system using spherical coordinates.

According to another aspect of the present invention, a vehicle guidance system is provided, comprising: a position determination system mounted on a vehicle for receiving GPS coordinates as the vehicle traverses a path corresponding to a circular arc traversed by a center pivot irrigation system; and a processor in communication with the position determination system, the processor comprising a means for collecting position data for the vehicle as the vehicle traverses the path, and a means for processing the position data to determine a center of rotation of the center pivot irrigation system using spherical coordinates.

According to another aspect of the present invention, a method for determining center coordinates of a circular arc on a spherical surface is provided, comprising: receiving position coordinates for a plurality of points along the circular arc; and processing the position coordinates for the plurality of points to determine the center coordinates of the circular arc in a three-dimensional coordinate system without converting the position coordinates into two-dimensional coordinates.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

A method and system for determining center point coordinates of a circular arc using spherical coordinates according to the present invention will now be described in detail with reference to FIGS. 1 to 9 of the accompanying drawings.

Figure 1:
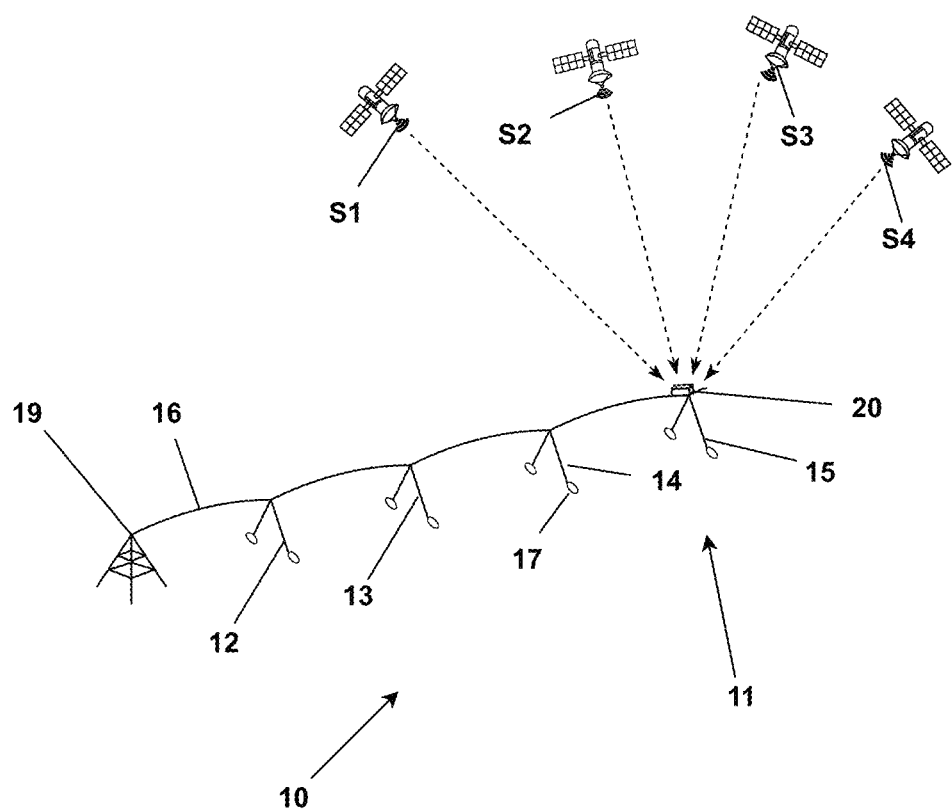
FIG. 1 is a perspective view of a center pivot irrigation system with a position monitoring unit of the present invention attached to the outermost tower.
Figure 2:
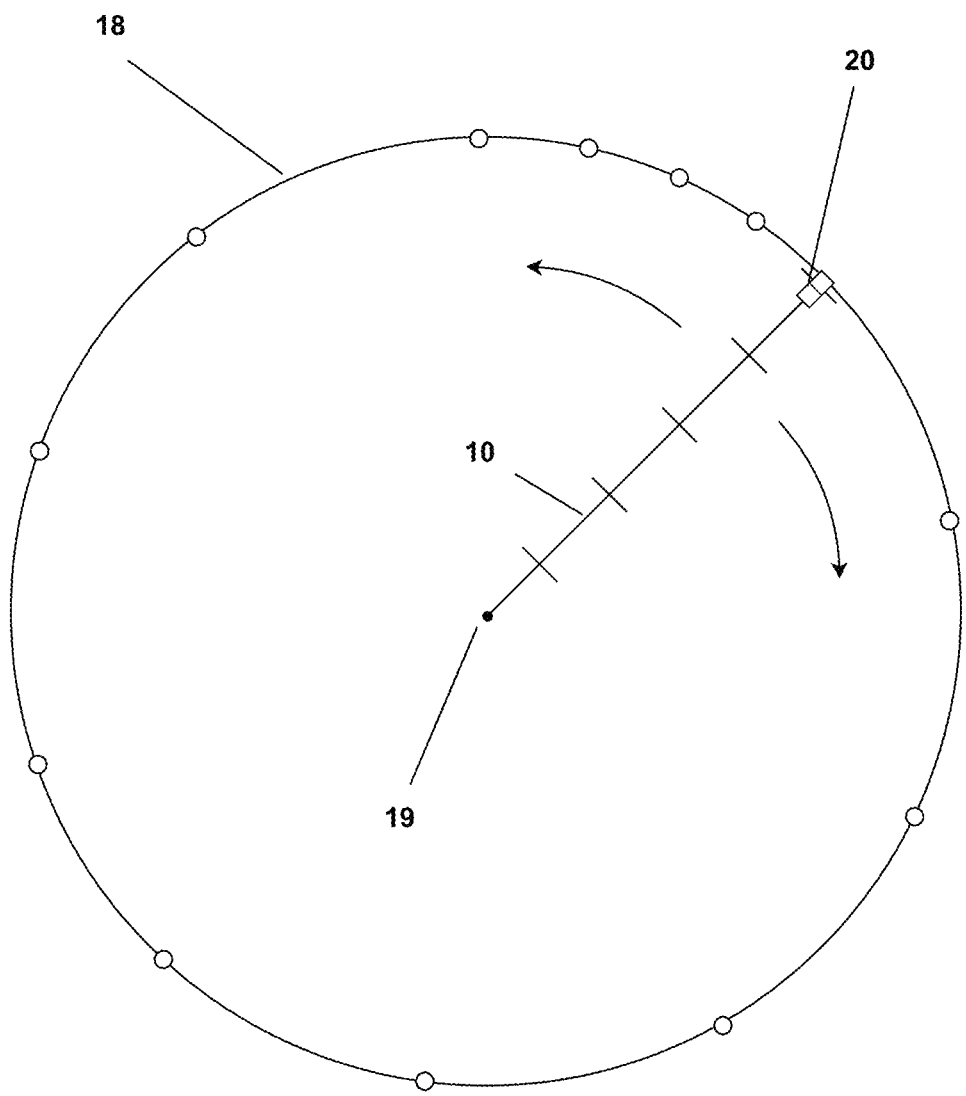
FIG. 2 is a plan view of an agricultural field showing a circular path traversed by the position monitoring unit of the present invention and the calculated center point of the circular path.

A center pivot irrigation system 10 with a position monitoring system 11 is shown in FIG. 1. The irrigation system 10 includes a plurality of support towers 12-15 that support a water pipe 16 above the field. The support towers 12-15 are supported by drive wheels 17 that move the irrigation system 10 in a circular path 18 around a fixed center pivot point 19. The outermost support tower 15 is located at an opposite end of the irrigation system 10 from the center pivot point 19.

Irrigation water under pressure flows from a water supply (not shown) into the water pipe 16 at the center pivot point 19. The water flows through the water pipe 16 and is dispensed through sprinkler heads, drop nozzles, and the like to irrigate the field. In operation, the support towers 12-15 each traverse a circular path around the center pivot point 19, or at least a circular arc in the case of an irrigation system that only covers a portion of a circle.

A position monitoring field unit 20 is attached to the irrigation system 10 at a location spaced from the center point 19. In a preferred embodiment, the field unit 20 is attached near the outer end of the irrigation system, such as on the last pipe span or the outermost support tower 15. By maximizing the distance from the fixed center point 19 to the field unit 20, the errors in position readings and calculated angular positions are reduced, thereby improving the accuracy of the position monitoring system 11.

Figure 3:
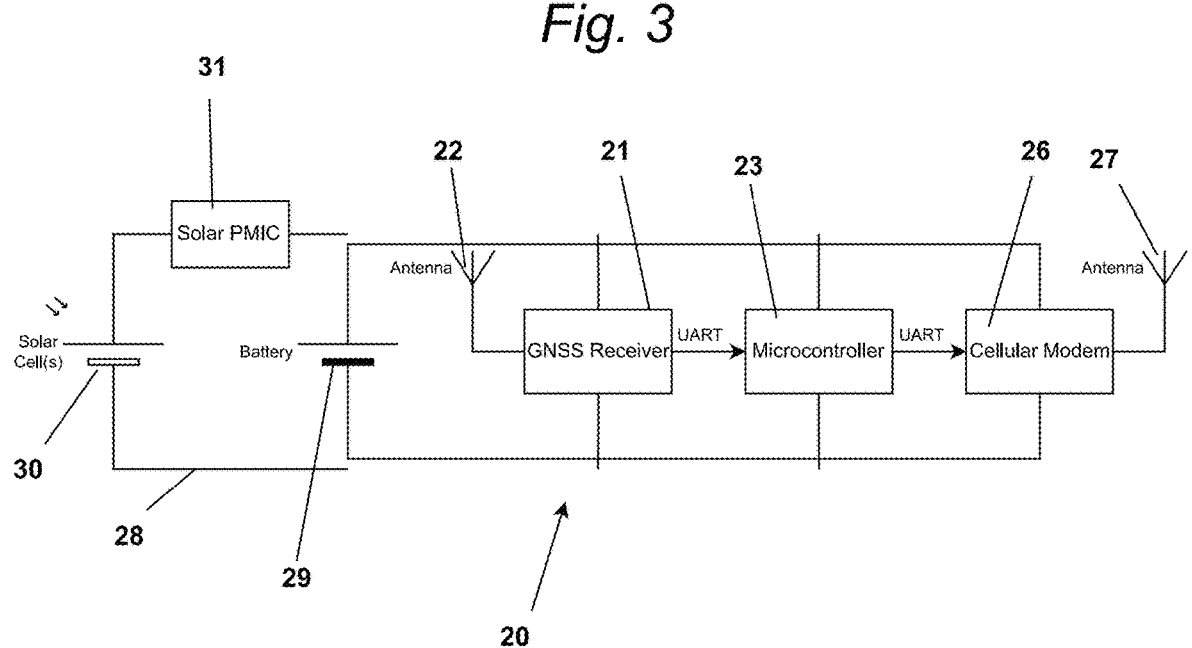
FIG. 3 is a schematic view of the position monitoring unit for receiving and communicating position coordinates as the center pivot irrigation system traverses its circular path around the field.

The field unit 20 is illustrated in FIG. 3. The field unit 20 includes a position signal receiver 21, such as a GNSS receiver with a suitable receiving antenna 22 for receiving GPS or other position signals from a plurality of satellites S1-S4. The position signals are communicated from the receiver 21 through a first UART to a microcontroller 23. The microcontroller 23 can be programmed with an algorithm to process the position signals to determine the coordinates for the center pivot point 19 of the irrigation system 10, as explained below. Alternatively, the microcontroller 23 can be programmed to transmit the received position signals to a remote database 24 and server 25 for further processing. Output from the microcontroller 23 is transmitted through a second UART to a transmitter 26, such as a cellular modem with a suitable transmitting antenna 27.

The field unit 20 also includes a self-contained power supply 28 for providing electrical power for the field unit 20. The power supply 28 includes a battery 29, one or more solar cells 30, and a solar PMIC 31 for management of the power supply. The self-contained power supply 28 allows the field unit 20 to be mounted on the irrigation system 10 and used without connecting the field unit 20 to the existing electrical system of the irrigation system 10.

Figure 4:
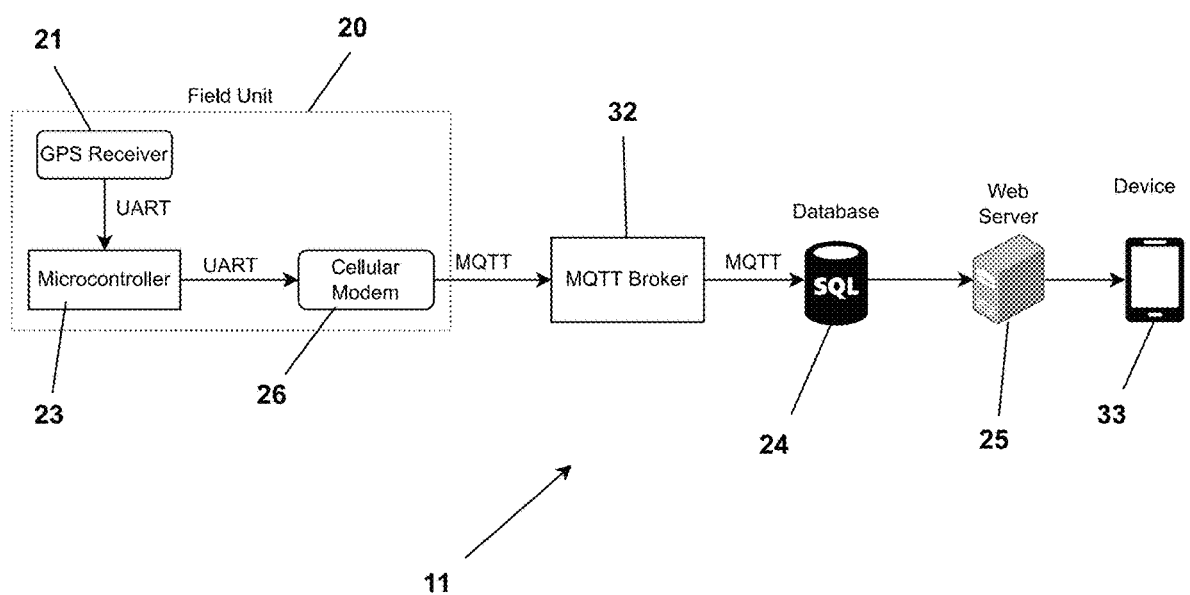
FIG. 4 illustrates the position monitoring system of the present invention, including the field unit for receiving and communicating position coordinates, a database for storing the position coordinates, and a server and device for processing and using the position coordinates and the calculated center point coordinates.

FIG. 4 illustrates the position monitoring system 11 of the present invention. The position monitoring system 11 includes the field unit 20 for receiving and communicating position coordinates via a suitable intermediary entity, such as an MQTT broker 32, to the database 24 and server 25. The database 24 stores the position coordinates received from the field unit 20. The server 25 processes the position coordinates stored in the database 24 using the algorithm developed by the Applicant to determine the center point coordinates of the circular arc traversed by the field unit 20. A client's device 33, such as a cell phone, tablet, PC or the like, is provided for displaying and using the calculated center point information generated by the server 25. For example, the calculated center point coordinates can be used in conjunction with the real-time position coordinates received from the field unit 20 to determine an angular position (i.e., azimuth) of the center pivot irrigation system 10 in the field.

Figure 5:
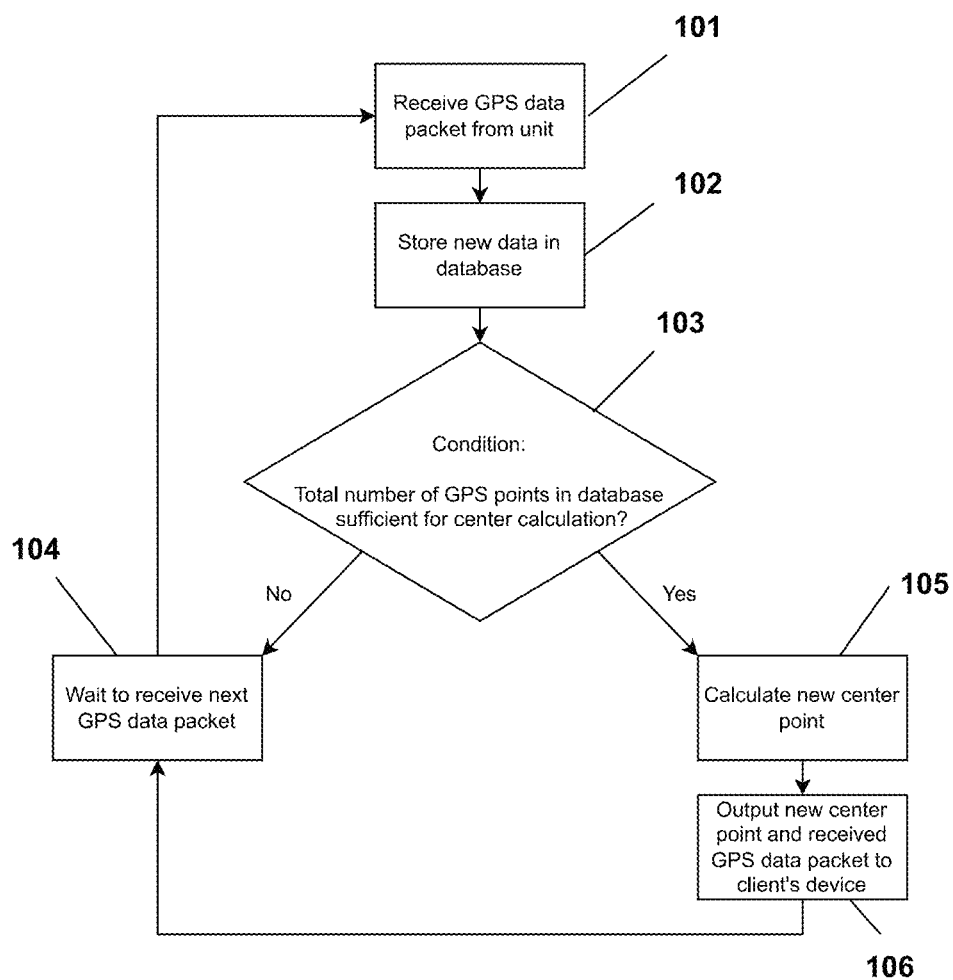
FIG. 5 is a flowchart illustrating the process of determining a center point of a circular path according to the present invention.

FIG. 5 illustrates the process for determining the position coordinates of the center pivot point 19 of the irrigation system 10. In the illustrated example, step 101 shows the position coordinates being transmitted as GPS data packets from the field unit 20 to the database 24 using a network protocol, such as MQTT. The data packets are stored in the database 24 in step 102. An algorithm is used to query the database 24 in step 103 to determine if the total number of GPS points in the database 24 is sufficient for calculating the center point coordinates. For example, at least three (3) data packets defining three (3) distinct points on a circular arc will be needed to run a center point calculation. If there are not enough GPS points yet in the database 24, then the algorithm will proceed to step 104 and wait to receive one or more additional GPS data packets.

Once the algorithm determines there are sufficient GPS points in the database 24 to run the center point calculation, then the process will proceed to step 105 to calculate the new center point coordinates based on the stored GPS points in the database 24. The calculated new center point coordinates and the most recent GPS data packet are then output to the client's device 33 in step 106. The client's device 33 can use the calculated center point and the most recent GPS data packet to determine and display the angular position of the center pivot irrigation system 10 in the field, as well as other information, such as the approximate speed of the irrigation system 10, the running time, and so forth. The position monitoring system 11 can also be used to automatically control various features on the irrigation system 10 based on the determined angular position of the irrigation system 10 in the field. For example, the irrigation system 10 can be stopped at a predetermined angular position, speed controlled to vary the rate of irrigation at predetermined angular positions, and/or controlled to start and stop the end gun and/or booster pump on the outer end of the irrigation system 10 at predetermined angular positions.

The algorithm developed by the Applicant determines the center point coordinates for the pivot irrigation system 10 using spherical coordinates for points along a circular arc 18 of the irrigation system 10, without converting the GPS coordinates into two-dimensional coordinates. The algorithm uses the geometric relationship for a cone inscribed in a sphere, with the sphere representing the Earth, the position coordinates defining points along a base perimeter of the cone, and an apex of the cone being located at the center of the Earth. A regression model is used to determine the center coordinates of the circular arc in a three-dimensional coordinate system. The center point calculation using spherical coordinates is explained in detail below:

1.1. GPS Coordinates Overview

Figure 6:
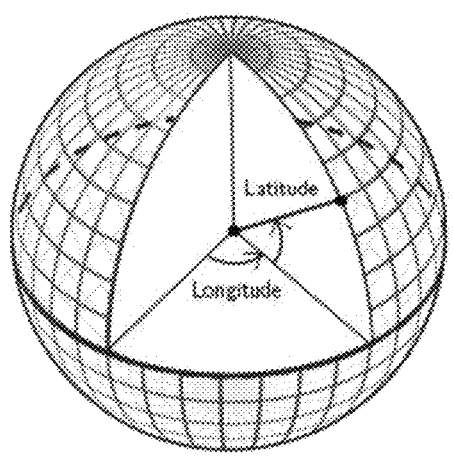
FIG. 6 is a diagram illustrating a GPS coordinate system.
Figure 7:
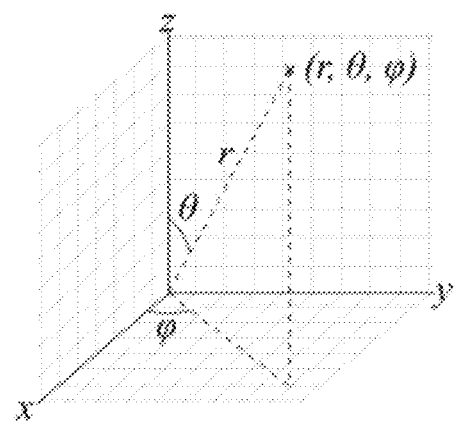
FIG. 7 is a diagram illustrating a spherical coordinate system.

Conventional GPS coordinates come in latitude and longitude pairs as illustrated in FIG. 6. The coordinate system used by GPS is similar to the spherical coordinate system which is displayed in FIG. 7. The only difference is the spherical system (FIG. 7) uses an inversion and 90° offset of the GPS latitude (FIG. 6). Thus, GPS coordinates and spherical coordinates can be related with Equations (3) and (4) as follows:

$$\theta = 90° - \text{Latitude}_{GPS} \quad (3)$$

$$\varphi = \text{Longitude}_{GPS} \quad (4)$$

The equations above show that GPS coordinates and spherical coordinates are practically identical. Therefore, the terms "spherical coordinates" and "GPS coordinates" are sometimes used interchangeably.

1.2. Cone Inscribed Sphere

Figure 8:
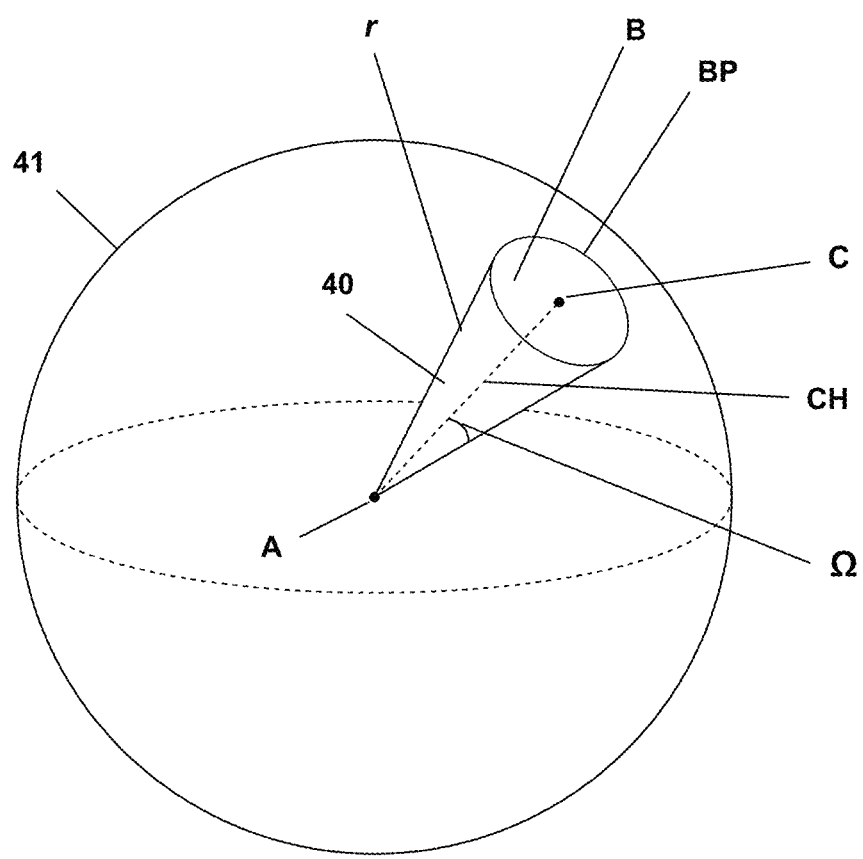
FIG. 8 is a diagram of a cone-inscribed sphere illustrating the geometry used in the present invention to calculate the center coordinates of a circular arc.

The present invention was derived by considering the geometric relationship of a center pivot sprinkler 10 on the surface of the Earth. The Earth can be represented as a sphere, while the circular arc 18 of the center pivot sprinkler 10 can be represented as the base of a cone inscribed in the sphere. FIG. 8 illustrates a cone 40 inscribed in a sphere 41. The Applicant's use of the spherical coordinate system to determine the coordinates of the center point C relies on the geometry depicted in FIG. 8.

The Applicant considered two shapes to solve the problem: a sphere 41 representing the Earth, and a cone 40 whose base B represents the area of a field covered by a center pivot sprinkler. The apex A, or point, of the cone 40 is located at the center of the Earth 41, and the slant height r represents the radius of the earth. The angle S2 is the angle between the cone's slant height r and center height CH. Angle S2 is constant around the cone 40, thus the angle between any point along the cone's base perimeter BP and center point C is angle Ω The Applicant then developed a regression model that takes points along the cone's base perimeter BP as input and finds a center point C where the angle between point C and each point on the base perimeter BP is constant.

1.3. Vector Dot Product

The next step in determining the center point coordinates was to construct a regression model to relate angle S2 to the center coordinates and the coordinates of points along the cone's base perimeter BP. The vector dot product equation was used for the regression model.

The vector dot product is defined by Equation (5) for two Cartesian vectors $\vec{V_1}$ and $\vec{V_2}$ extending to points $P(A_x, A_y, A_z)$ and $P(B_x, B_y, B_z)$, respectively:

where $\vec{V_1} = A_x\hat{x} + A_y\hat{y} + A_z\hat{z}$ and $\vec{V_2} = B_x\hat{x} + B_y\hat{y} + B_z\hat{z}$ $$\vec{V_1} \cdot \vec{V_2} = A_x B_x + A_y B_y + A_z B_z = |\vec{V_1}| \, |\vec{V_2}| \cos \Omega \quad (5)$$

It should be noted that Ω is the angle between vectors $\vec{V_1}$ and $\vec{V_2}$ and the result of their dot product is a scalar number. Equation (5) includes angle Ω but does not yet include the center coordinates or coordinates of the cone's base. To include these parameters, the following substitutions can be made:

where point $P(A_x, A_y, A_z) = P(r_1, \theta_1, \varphi_1)$ and point $P(B_x, B_y, B_z) = P(r_2, \theta_2, \varphi_2)$ $$A_x = r_1 \sin \theta_1 \cos \varphi_1 \text{ and } B_x = r_2 \sin \theta_2 \cos \varphi_2 \quad (6)$$

$$A_y = r_1 \sin \theta_1 \cos \varphi_1 \text{ and } B_y = r_2 \sin \theta_2 \cos \varphi_2 \quad (7)$$

$$A_z = r_1 \cos \theta_1 \text{ and } B_z = r_2 \cos \theta_2 \quad (8)$$

By substituting Equations (6), (7), and (8) back into the previous dot product equation, the following Equation 9 can be obtained:

$$\vec{V_1} \cdot \vec{V_2} = r_1 \sin \theta_1 \cos \varphi_1 r_2 \sin \theta_2 \cos \varphi_2 + r_1 \sin \theta_1 \sin \varphi_1 r_2 \sin \theta_2 \sin \varphi_2 + r_1 \cos \theta_1 r_2 \cos \theta_2 \quad (9)$$

Next, the radii $r_1$ and $r_2$ can be factored out as indicated in Equation 10:

$$\vec{V_1} \cdot \vec{V_2} = r_1 r_2 (\sin \theta_1 \cos \varphi_1 \sin \theta_2 \cos \varphi_2 + \sin \theta_1 \sin \varphi_1 \sin \theta_2 \sin \varphi_2 + \cos \theta_1 \cos \theta_2) \quad (10)$$

The magnitudes $|\vec{V_1}|$ and $|\vec{V_2}|$ are equal to $r_1$ and $r_2$, respectively. Therefore, the dot product in terms of the magnitudes of $\vec{V_1}$ and $\vec{V_2}$ is the following Equation 11:

$$\vec{V_1} \cdot \vec{V_2} = |\vec{V_1}| \, |\vec{V_2}| \cos \Omega = r_1 r_2 \cos \Omega \quad (11)$$

By substituting Equation (11) into Equation (10), the following Equation 12 can be obtained:

$$r_1 r_2 \cos \Omega = r_1 r_2 (\sin \theta_1 \cos \varphi_1 \sin \theta_2 \cos \varphi_2 + \sin \theta_1 \sin \varphi_1 \sin \theta_2 \sin \varphi_2 + \cos \theta_1 \cos \theta_2) \quad (12)$$

Notice that the product of radii $r_1$ and $r_2$, $r_1 r_2$, can be cancelled out of either side of Equation (12). Therefore, Equation (12) can be rewritten as the following Equation (13):

$$\cos\Omega = \sin\theta_1 \cos\varphi_1 \sin\theta_2 \cos\varphi_2 + \sin\theta_1 \sin\varphi_1 \sin\theta_2 \sin\varphi_2 + \cos\theta_1 \cos\theta_2 \quad (13)$$

Equation (13) relates angle $\Omega$ and two spherical points $P(r_1, \theta_1, \varphi_1)$ and $P(r_2, \theta_2, \varphi_2)$. A linear regression can then be run using Equation (13) as the model. Linear regression is the process of taking a set of data points and finding the optimal coefficients for a linear relationship. For example, for a given set of (x, y) points the linear relationship between x and y can be found using the following regression model:

$$y = mx + b \quad (14)$$

The result of the regression is scalar values for variables m and b. Similarly, for a set of output y values with multiple inputs $x_1$ and $x_2$, the regression model (14) is adapted into the following:

$$y = m_1 x_1 + m_2 x_2 + b \quad (15)$$

Regression model (15) happens to have the same number of terms as Equation (13), so (13) can be rewritten to have the same input/output format as (15). This is accomplished by dividing both sides of (13) by $\cos\theta_2$:

$$\frac{\cos\Omega}{\cos\theta_2} = \frac{\sin\theta_1 \cos\varphi_1 \sin\theta_2 \cos\varphi_2}{\cos\theta_2} + \frac{\sin\theta_1 \sin\varphi_1 \sin\theta_2 \sin\varphi_2}{\cos\theta_2} + \frac{\cos\theta_1 \cos\theta_2}{\cos\theta_2} \quad (16)$$

The trigonometric identity (17) is then used to move and reorder terms in (16) to get Equation (18), which can be used as the regression model in the present invention:

$$\tan\theta = \frac{\sin\theta}{\cos\theta} \quad (17)$$

$$\cos\theta_1 = -\tan\theta_2 \cos\varphi_2 \sin\theta_1 \cos\varphi_1 - \tan\theta_2 \sin\varphi_2 \sin\theta_1 \sin\varphi_1 + \frac{\cos\Omega}{\cos\theta_2} \quad (18)$$

Equation (18) is referring to spherical points $P(r_1, \theta_1, \varphi_1)$ and $P(r_2, \theta_2, \varphi_2)$. Since $r_1$ and $r_2$ are not considered in this equation, the points can instead be stated as $P(\theta_1, \varphi_1)$ and $P(\theta_2, \varphi_2)$. To give more meaning to these two points, $P(\theta_1, \varphi_1)$ can be renamed to $P(\theta_b, \varphi_b)$, and $P(\theta_2, \varphi_2)$ can be renamed to $P(\theta_c, \varphi_c)$. Spherical point $P(\theta_b, \varphi_b)$ is referring to points along the base perimeter of the cone in FIG. 8, and spherical point $P(\theta_c, \varphi_c)$ is referring to the center point C in FIG. 8. The following equation is (18) with the new point definitions:

$$\cos\theta_b = -\tan\theta_c \cos\varphi_c \sin\theta_b \cos\varphi_b - \tan\theta_c \sin\varphi_c \sin\theta_b \sin\varphi_b + \frac{\cos\Omega}{\cos\theta_c} \quad (19)$$

Note that (19) is the same form as (15) where:

$$y = \cos\theta_b \quad (20)$$

$$m_1 = \tan\theta_c \cos\varphi_c \text{ and } x_1 = -\sin\theta_b \cos\varphi_b \quad (21)$$

$$m_2 = \tan\theta_c \sin\varphi_c \text{ and } x_2 = -\sin\theta_b \sin\varphi_b \quad (22)$$

$$b = \frac{\cos\Omega}{\cos\theta_c} \quad (23)$$

Recall that the goal is to calculate the latitude and longitude of the center of the sprinkler's arc. From the relationships defined in Equations (3) and (4), it should be clear that the latitude and longitude of the center is point P ($\theta_c$, $\varphi_c$). The center point coordinates will therefore correspond to latitude $\theta_c$ and longitude $\varphi_c$. By running a linear regression on Equation (19) using points $P(\theta_b, \varphi_b)$ as data, scalar values will be obtained for $\tan\theta_c \cos\varphi_c$, $\tan\theta_c \sin\varphi_c$, and $\cos\Omega/\cos\theta_c$, and these values will be referred to as $m_1$, $m_2$, and b, respectively. To find $\varphi_c$, $m_2$ can be divided by $m_1$ and trigonometric identity (17) can be applied as follows:

$$\frac{m_2}{m_1} = \frac{\tan\theta_c \sin\varphi_c}{\tan\theta_c \cos\varphi_c} = \frac{\sin\varphi_c}{\cos\varphi_c} = \tan\varphi_c \quad (24)$$

Equation (24) shows that a value for $\varphi_c$ can be obtained by taking the inverse tangent of the ratio of $m_2$ and $m_1$:

$$\varphi_c = \tan^{-1}\left(\frac{m_2}{m_1}\right) \quad (25)$$

To find the value of $\theta_c$, the calculated value of $\varphi_c$ can be substituted into $m_1$ or $m_2$. For example, to solve using $m_1$, both sides of $m_1$'s definition in (21) is divided by $\cos\varphi_c$ as follows:

$$\frac{m_1}{\cos\varphi_c} = \tan\theta_c \quad (26)$$

The inverse tangent of (26) is then taken to find $\theta_c$:

$$\theta_c = \tan^{-1}\left(\frac{m_1}{\cos\varphi_c}\right) \quad (27)$$

The resulting values for $\theta_c$ and $\varphi_c$ can then be converted into GPS coordinates. This can be accomplished using the relationships defined in Equations (3) and (4) as follows:

$$\text{GPS Latitude}_{center} = 90° - \theta_c \quad (28)$$

$$\text{GPS Longitude}_{center} = \varphi_c \quad (29)$$

With these values found, the center coordinates of the center pivot sprinkler have been determined, and the location of the sprinkler in the field can be expressed.

Working Example—Irrigation Monitoring System

The field unit 20 that acquires the GPS data for the present invention can be constructed with the following electrical hardware: microcontroller or microprocessor 23, cellular modem 26, GPS receiver 21, solar cell(s) 30, battery 29 and related PMIC 31, and appropriate antennas 22 and 27 for GPS and cellular systems, respectively. This electrical hardware is installed in a weatherproof enclosure with suitable structure for attaching to the center pivot sprinkler system.

The microcontroller or microprocessor 23 of the field unit 20 communicates with the cellular modem 26 and GPS receiver 21 via serial communication, such as UART. The microcontroller or microprocessor 23 can be integrated into the same package as the cellular modem 26. Once the GPS receiver 21 has acquired a position fix, the microcontroller 23 relays the GPS data to the cellular modem 26 where it is then sent to a cloud database 24 via a network protocol 32 such as MQTT. Once the data has been transmitted, the microcontroller or microprocessor 23 will enable a low-power consumption mode for the field unit 20 for a set interval of time before repeating the data acquisition and transmission process. The battery 29 powering the field unit 20 is a rechargeable battery that is recharged via solar power from the solar cell(s) 30.

The server 25 uses the GPS coordinates stored in the database 24 to calculate the center coordinates of the center pivot sprinkler using the present invention. The calculated center coordinates and recorded GPS coordinates are used to display the location or angular position of the center pivot sprinkler to a user via a website or other application. The calculated center coordinates and recorded GPS coordinates can also be used to activate various features on the center pivot sprinkler based on the determined angular position, such as end gun operation, variable rate irrigation, stop, reverse, speed and so forth.

Vehicle Guidance System

Figure 9:
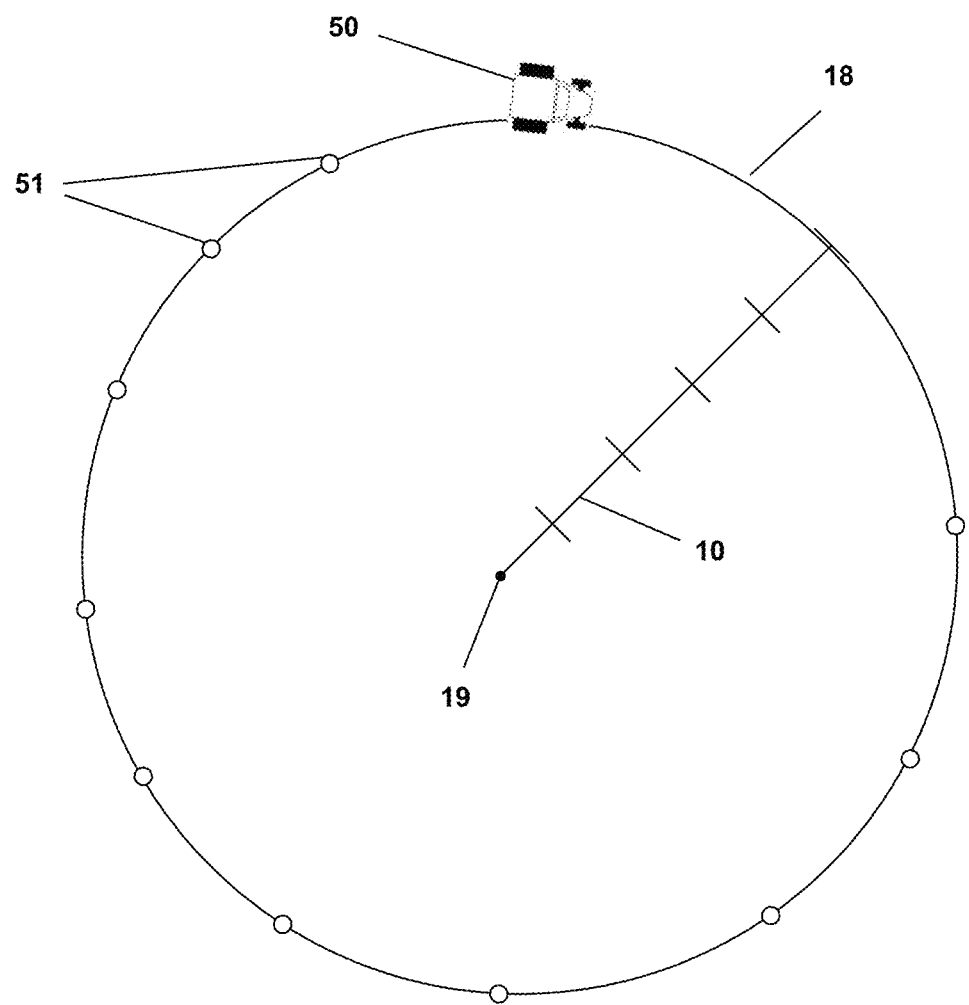
FIG. 9 is a plan view of an agricultural field showing a vehicle guidance system using the center point calculation method of the present invention to create circular guidance lines that are concentric with the determined center pivot point.

In an alternative embodiment illustrated in FIG. 9, the method of determining coordinates of a center point 19 of a center pivot irrigation system 10 according to the present invention can also be implemented into a vehicle guidance system. The method can be used to determine the center point coordinates of the center pivot irrigation system 10 when operating the vehicle guidance system in center pivot mode to create circular guidance lines that are concentric with the determined center pivot point 19.

The vehicle guidance system includes a position determination system mounted on a vehicle 50 for receiving GPS coordinates as the vehicle 50 is driven along a path 18 corresponding to a circular arc traversed by the center pivot irrigation system 10. For example, the vehicle 50 can be driven in a circular arc following a wheel track of the irrigation system 10 while the position determination system collects a set of GPS coordinates for points 51 along the circular arc 18. The set of GPS coordinates are then processed using the Applicant's algorithm described above to determine a center of rotation 19 of the center pivot irrigation system. As with the other embodiments described above, the algorithm used with the vehicle guidance system can be implemented using spherical coordinates to improve the accuracy and efficiency of the center point determination.

While the invention has been described in connection with specific embodiments thereof, it is to be understood that this is by way of illustration and not of limitation, and the scope of the appended claims should be construed as broadly as the prior art will permit.

What is claimed is:

1. A method of determining center coordinates of a center pivot irrigation system, comprising:
   providing a GNSS receiver for receiving GNSS coordinates and a processor for processing said GNSS coordinates;
   receiving GNSS coordinates with said GNSS receiver for a plurality of points along a circular arc traversed by the center pivot irrigation system; and
   processing said GNSS coordinates for said plurality of points with said processor to determine the center coordinates of a center pivot point of the center pivot irrigation system by solving a geometric relationship for a cone inscribed in a sphere, with the sphere representing the Earth, the GNSS coordinates defining points along a base perimeter of the cone, and an apex of the cone being located at the center of the Earth.

2. The method according to claim 1, wherein said GNSS coordinates are processed to determine the center coordinates without converting the GNSS coordinates into two-dimensional coordinates.

3. The method according to claim 1, wherein said GNSS coordinates are processed using a regression model that relates an angle Ω between a slant height and center height of the cone to the center coordinates and the GNSS coordinates for points along the base perimeter of the cone.

4. The method according to claim 1, wherein the latitude of said GNSS coordinates are converted to spherical coordinates by adding 90° and sign inversion and said geometric relationship is represented by equation:

$$\cos \Omega = \sin \theta_b \cos \varphi_b \sin \theta_c \cos \varphi_c + \sin \theta_b \sin \varphi_b \sin \theta_c \sin \varphi_c + \cos \theta_b \cos \theta_c$$

where Ω is the angle between the slant height and center height of the cone, $\theta_b$ is the updated latitude of a point along the base perimeter of the cone, $\varphi_b$ is the longitude of the point along the base perimeter of the cone, $\theta_c$ is the updated latitude of the point located in the center of the base of the cone, and $\varphi_c$ is the longitude of the point located in the center of the base of the cone.

5. The method according to claim 4, wherein said equation is algebraically manipulated into linearized equation:

$$\cos\theta_b = -\tan\theta_c\cos\varphi_c\sin\theta_b\cos\varphi_b - \tan\theta_c\sin\varphi_c\sin\theta_b\sin\varphi_b + \frac{\cos\Omega}{\cos\theta_c}$$

to be used with a plurality of $\theta_b$, $\varphi_b$ pairs in linear regression to produce the center coordinates $\theta_c$, $\varphi_c$.

6. The method according to claim 1, wherein said step of receiving GNSS coordinates comprises placing said GNSS receiver on the center pivot irrigation system at a location spaced from the center pivot point, and collecting GNSS coordinates for said plurality of points as said center pivot irrigation system moves over the field.

7. The method according to claim 6, wherein said GNSS receiver is integrated into a system for monitoring a rotational position of said center pivot irrigation system in the field, and wherein said method provides a means for determining the center coordinates of the center pivot point when using said system.

8. The method according to claim 1, wherein said step of receiving GNSS coordinates comprises:
   mounted mounting said GNSS receiver on a vehicle;
   driving the vehicle along a path that corresponds to the circular arc traversed by the center pivot irrigation system; and
   using said GNSS receiver to collect said GNSS coordinates as the vehicle travels along said path.

9. The method according to claim 1, wherein said geometric relationship is represented using a spherical coordinate system.

10. The method according to claim 1, wherein said center coordinates are determined using only latitude and longitude data from the plurality of points along the circular arc.

11. An irrigation monitoring system for monitoring a rotational position of a center pivot irrigation system in a field, comprising:
   a GNSS receiver for receiving GNSS coordinates at a plurality of points along a circular arc traversed by the center pivot irrigation system; and
   means for processing said GNSS coordinates to determine center coordinates of a center pivot point of the center pivot irrigation system and the rotational position of the center pivot irrigation system using spherical coordinates;

wherein said means for processing said GNSS coordinates is programmed for calculations based on a geometric relationship for a cone inscribed in a sphere, with the sphere representing the Earth, the GNSS coordinates defining points along a base perimeter of the cone, and an apex of the cone being located at the center of the Earth; and wherein said means for processing said GNSS coordinates uses a regression model that relates an angle $\Omega$ between a slant height and center height of the cone to the center coordinates and the GNSS coordinates for points along the base perimeter of the cone.

12. The irrigation monitoring system according to claim 11, wherein said means for processing said GNSS coordinates determines the center coordinates without converting the GNSS coordinates into two-dimensional coordinates.

13. The irrigation monitoring system according to claim 11, wherein said means for processing said GNSS coordinates is programmed to convert the latitude of said GNSS coordinates to spherical coordinates by adding 90° and sign inversion, and said geometric relationship is represented by equation:

$\cos \Omega = \sin \theta_b \cos \varphi_b \sin \theta_c \cos \varphi_c + \sin \theta_b \sin \varphi_b \sin \theta_c \sin \varphi_c + \cos \theta_b \cos \theta_c$ where $\Omega$ is the angle between the slant height and center height of the cone, $\theta_b$ is the updated latitude of a point along the base perimeter of the cone, $\varphi_b$ is the longitude of the point along the base perimeter of the cone, $\theta_c$ is the updated latitude of the point located in the center of the base of the cone, and $\varphi_c$ is the longitude of the point located in the center of the base of the cone.

14. The irrigation monitoring system according to claim 11, wherein said GNSS receiver is placed on the center pivot irrigation system at a location spaced from the center pivot point for collecting GNSS coordinates for said plurality of points along the circular arc as said center pivot irrigation system moves over the field.

15. A method for determining center coordinates of a circular arc on a spherical surface, comprising:
receiving position coordinates for a plurality of points along the circular arc; and
processing said position coordinates for said plurality of points to determine the center coordinates of the circular arc in a three-dimensional coordinate system without converting the position coordinates into two-dimensional coordinates;

wherein said position coordinates are processed by solving a geometric relationship for a cone inscribed in a sphere, with the sphere representing the Earth, the position coordinates defining points along a base perimeter of the cone, and an apex of the cone being located at the center of the Earth, and wherein said position coordinates are processed using a regression model that relates an angle $\Omega$ between a slant height and center height of the cone to the center coordinates and the position coordinates for points along the base perimeter of the cone; and wherein said position coordinates comprise GNSS latitude and longitude coordinates, the latitude of said GNSS coordinates are converted to spherical coordinates by adding 90° and sign inversion, and said geometric relationship is represented by equation:

$\cos \Omega = \sin \theta_b \cos \varphi_b \sin \theta_c \cos \varphi_c + \sin \theta_b \sin \varphi_b \sin \theta_c \sin \varphi_c + \cos \theta_b \cos \theta_c$ where $\Omega$ is the angle between the slant height and center height of the cone, $\theta_b$ is the updated latitude of a point along the base perimeter of the cone, $\varphi_b$ is the longitude of the point along the base perimeter of the cone, $\theta_c$ is the updated latitude of the point located in the center of the base of the cone, and $\varphi_c$ is the longitude of the point located in the center of the base of the cone, and wherein said equation is algebraically manipulated into linearized equation:

$$\cos\theta_b = -\tan\theta_c \cos\varphi_c \sin\theta_b \cos\varphi_b - \tan\theta_c \sin\varphi_c \sin\theta_b \sin\varphi_b + \frac{\cos\Omega}{\cos\theta_c}$$

to be used with a plurality of $\theta_b$, $\varphi_b$ pairs in linear regression to produce the center coordinates $\theta_c$, $\varphi_c$.

16. The method for determining center coordinates of a circular arc according to claim 15, wherein said circular arc is a path traversed by a GNSS receiver positioned on a center pivot irrigation system.

17. The irrigation monitoring system according to claim 11, wherein said means for processing said GNSS coordinates determines said center coordinates using only latitude and longitude data from the plurality of points along the circular arc.

18. The method for determining center coordinates of a circular arc according to claim 15, wherein said circular arc is a path traversed by a center pivot irrigation system.

* * * * *